(12) United States Patent
Vujicic et al.

(10) Patent No.: US 10,080,919 B1
(45) Date of Patent: *Sep. 25, 2018

(54) EPICYCLIC GEAR SYSTEM FOR USE IN EXERCISE EQUIPMENT

(71) Applicant: Shinn Fu Corporation, Taipei (TW)

(72) Inventors: Marko Vujicic, Tustin, CA (US); Chien-Chi Su, Taipei (TW)

(73) Assignee: Shinn Fu Corporation, Taipei (TW)

( * ) Notice: Subject to any disclaimer, the term of this patent is extended or adjusted under 35 U.S.C. 154(b) by 239 days.

This patent is subject to a terminal disclaimer.

(21) Appl. No.: 15/091,557

(22) Filed: Apr. 5, 2016

Related U.S. Application Data

(63) Continuation-in-part of application No. 14/338,529, filed on Jul. 23, 2014, now Pat. No. 9,302,148, which (Continued)

(51) Int. Cl.
*A63B 22/06* (2006.01)
*F16H 1/28* (2006.01)
(Continued)

(52) U.S. Cl.
CPC ...... *A63B 22/0605* (2013.01); *A63B 23/0476* (2013.01); *F16F 15/315* (2013.01); *F16H 1/28* (2013.01); *A63B 21/225* (2013.01); *A63B 22/0015* (2013.01); *A63B 22/0664* (2013.01); *A63B 23/04* (2013.01); *A63B 2022/0611* (2013.01); *A63B 2022/0641* (2013.01); *A63B 2022/0658* (2013.01); *A63B 2022/0688* (2013.01); *A63B 2225/09* (2013.01); *A63B 2225/093* (2013.01); *F16H 33/02* (2013.01); *F16H 2001/2872* (2013.01)

(58) Field of Classification Search
CPC . A63B 22/0605; A63B 22/0023; A63B 22/14; A63B 22/16; A63B 22/18; A63B 2022/0641; F16H 1/28; F16H 2001/2872; F16H 33/02
USPC ............... 482/51–78; 475/11, 165, 169, 183, 475/267–268, 338, 342, 349; 74/10.52, 74/433.5, 594.2; 477/69
See application file for complete search history.

(56) References Cited

U.S. PATENT DOCUMENTS 3,964,742 A 6/1976 Carnielli
4,272,094 A 6/1981 Patrin
(Continued)

FOREIGN PATENT DOCUMENTS

CN 2061548 U 2/1990
CN 2325081 Y 6/1999
(Continued)

*Primary Examiner* — Joshua Lee

(57) ABSTRACT

An epicyclic gear system features a cylindrical flywheel with a flywheel cavity, a plurality of mounting pillars, an annular ring gear mounted on the mounting pillars, and an annular sun gear mounted to and extending from the flywheel cavity. The epicyclic gear system has a planet carrier mounted to an axle shaft and a planet gear mounted to the planet carrier. The axle shaft passes through an axle aperture, a ring gear aperture, and a sun gear aperture. The planet gear engages the ring gear and the sun gear to provide a desired gear ratio for rotating the flywheel via rotation of the axle shaft, the planet carrier, the planet gear, and the sun gear.

19 Claims, 10 Drawing Sheets

Related U.S. Application Data is a continuation-in-part of application No. 13/106,497, filed on May 12, 2011, now Pat. No. 8,876,669.

(60) Provisional application No. 61/334,396, filed on May 13, 2010.

(51) Int. Cl.
*F16F 15/315* (2006.01)
*A63B 23/04* (2006.01)
*A63B 22/00* (2006.01)
*A63B 21/22* (2006.01)
*F16H 33/02* (2006.01)

(56) References Cited

U.S. PATENT DOCUMENTS

| | | | |
|---|---|---|---|
| 4,309,043 A | 1/1982 | Brown | |
| 4,452,445 A | 6/1984 | Csekes | |
| 4,632,386 A | 12/1986 | Beech | |
| 4,712,806 A | 12/1987 | Patrin | |
| 4,809,970 A | 3/1989 | Beistegui | |
| 4,880,224 A | 11/1989 | Jonas et al. | |
| 4,957,282 A | 9/1990 | Wakefield | |
| 5,031,902 A | 7/1991 | Findlay | |
| 5,288,280 A | 2/1994 | Polnik | |
| 5,292,293 A * | 3/1994 | Schumacher | A63B 24/00 482/119 |
| 5,480,366 A | 1/1996 | Harnden et al. | |
| 6,119,840 A | 9/2000 | Dettmar | |
| 6,126,577 A | 10/2000 | Chang | |
| 6,468,178 B1 | 10/2002 | Mohtasham | |
| 7,163,491 B2 | 1/2007 | Rufino | |
| 7,704,192 B2 | 4/2010 | Dyer et al. | |
| 7,927,258 B2 | 4/2011 | Irving et al. | |
| 2002/0077221 A1 | 6/2002 | Dalebout et al. | |
| 2005/0173180 A1 | 8/2005 | Hypes et al. | |
| 2005/0209064 A1 | 9/2005 | Peterson | |
| 2005/0245347 A1 | 11/2005 | Liang | |
| 2006/0217237 A1 | 9/2006 | Rhodes et al. | |
| 2007/0072744 A1 | 3/2007 | Badarneh et al. | |
| 2007/0275811 A1 | 11/2007 | Starik | |
| 2008/0051258 A1 | 2/2008 | Schmehl et al. | |
| 2009/0036276 A1 | 2/2009 | Loach | |
| 2009/0156371 A1 | 6/2009 | Goldberg | |
| 2009/0170667 A1 | 7/2009 | Irving et al. | |
| 2012/0071301 A1 | 3/2012 | Kaylor et al. | |
| 2012/0217758 A1 | 8/2012 | Chen | |
| 2013/0199317 A1 | 8/2013 | Law et al. | |

FOREIGN PATENT DOCUMENTS

| | | |
|---|---|---|
| CN | 200710073661 | 3/2009 |
| KR | 100954300 | 4/2010 |
| TW | 595486 | 6/2004 |
| TW | 200642718 | 12/2006 |
| TW | I325219 | 5/2010 |
| WO | WO2007055584 A1 | 5/2007 |
| WO | WO2010118899 A1 | 10/2010 |

\* cited by examiner

US 10,080,919 B1

EPICYCLIC GEAR SYSTEM FOR USE IN EXERCISE EQUIPMENT

CROSS REFERENCE

This application is a continuation-in-part and claims benefit of U.S. patent application Ser. No. 14/338,529 filed Jul. 23, 2014, which is a continuation-in-part and claims benefit of U.S. patent application Ser. No. 13/106,497 filed May 12, 2011, now U.S. Pat. No. 8,876,669 granted on Nov. 4, 2014, which is a non-provisional and claims benefit of U.S. Provisional Patent Application No. 61/334,396, filed May 13, 2010, the specification(s) of which is/are incorporated herein in their entirety by reference.

FIELD OF THE INVENTION

The present invention relates to epicyclic, or planetary gear systems, in particular, for use with exercise equipment.

BACKGROUND OF THE INVENTION

A common stationary exercise bicycle typically comprises a direct drive system for resistance, for example a chain or belt drive system. Generally, the main crank has pedals that are attached to a toothed chain gear or a belt pulley. The pedals are oriented such that they are parallel to the floor. The toothed chain gear or belt pulley is attached via a chain or a belt to the smaller toothed chain gear or timing belt pulley, which is attached to the primary flywheel. The flywheel can be mounted either in front or behind the main crank, and typically weighs about 45 pounds.

The present invention features an epicyclic gear system for use in exercise equipment (e.g., stationary bicycle systems, spinning machines, rowing machines, abdominal machines, and the like). Said systems of the invention are much lighter and more compact while still being able to generate and achieve an inertia equivalent to the inertia produced by traditionally larger and/or heavier flywheels.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features an epicyclic gear system. In some embodiments, the system comprises a cylindrical flywheel cavity centrally located on a second flywheel side. In some embodiments, a side lip is located on the second flywheel side next to a flywheel outer periphery. In some embodiments, an axle aperture is located in a flywheel center. In some embodiments, a flat radial edge is located on the flywheel outer periphery for a braking interface.

In some embodiments, the system comprises an annular ring gear. In some embodiments, a ring gear aperture is located in a ring gear center. In some embodiments, gear teeth are located around the ring gear. In some embodiments, the ring gear is concentrically located on a frame via cylindrical mounting pillars. In some embodiments, the ring gear projects into the flywheel cavity.

In some embodiments, the system comprises an annular sun gear. In some embodiments, a sun gear aperture is located in a sun gear center. In some embodiments, the sun gear is affixed to and concentrically located on the second flywheel side. In some embodiments, the sun gear extends out and away from the second flywheel side. In some embodiments, gear teeth are located around a sun gear outer periphery. In some embodiments, the system comprises an axle shaft.

In some embodiments, the system comprises a planet carrier having a carrier inner mounting component and a carrier outer mounting component. In some embodiments, the carrier inner mounting component is fixedly located on the axle shaft. In some embodiments, the system comprises a planet gear rotatably located on the carrier outer mounting component.

In some embodiments, a flywheel assembly (200), a planet gear assembly (300), and a ring gear assembly (420) are interfacingly assembled together. In some embodiments, the axle shaft rotatingly passes through the axle aperture, the ring gear aperture, and the sun gear aperture. In some embodiments, the planet gear engages the ring gear and the sun gear to provide a desired gear ratio for rotating the flywheel via rotation of the axle shaft, the planet carrier, the planet gear, and the sun gear.

DESCRIPTION OF PREFERRED EMBODIMENTS

Figure 1:
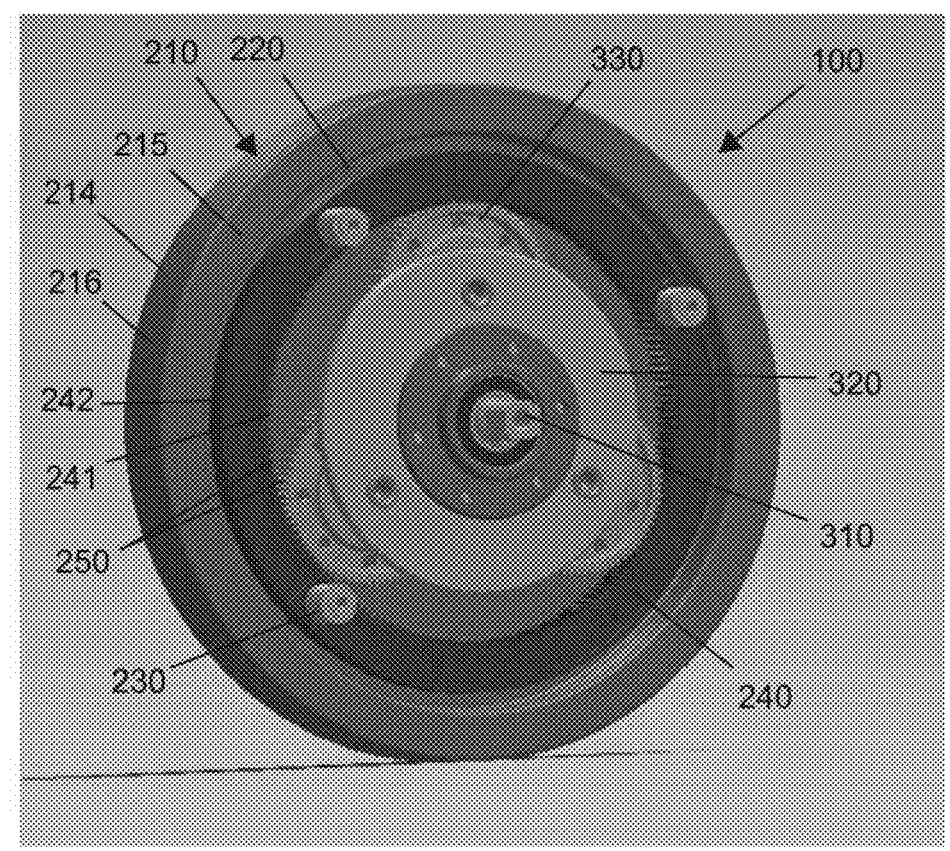
FIG. 1 shows a perspective view of the present invention with the planet carrier in place.
Figure 2:
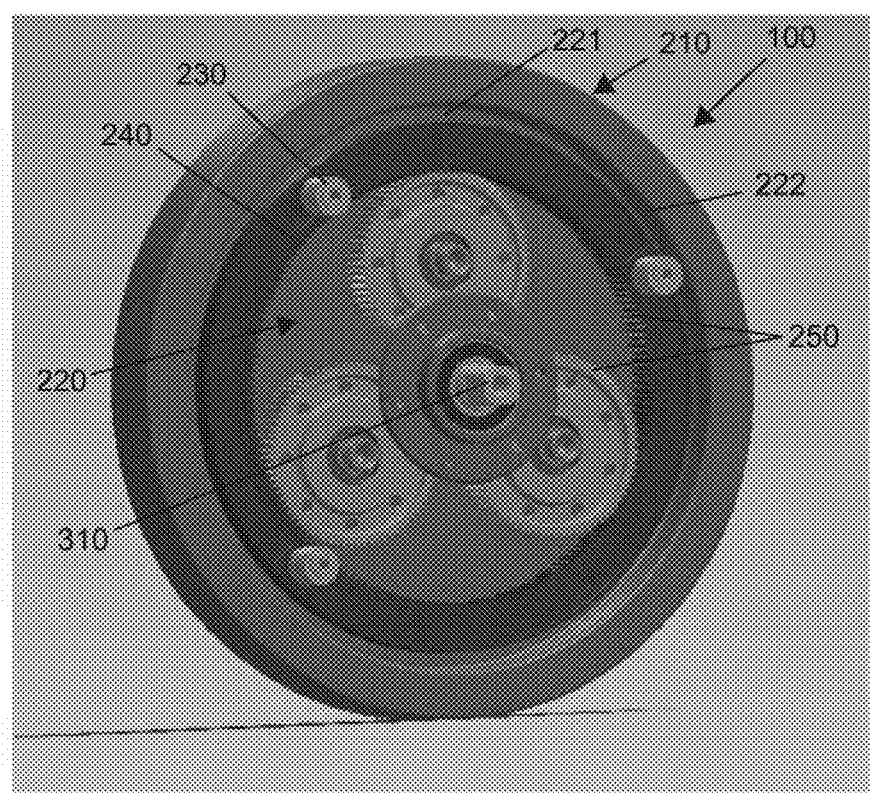
FIG. 2 shows a perspective view of the present invention with the planet carrier removed.
Figure 3:
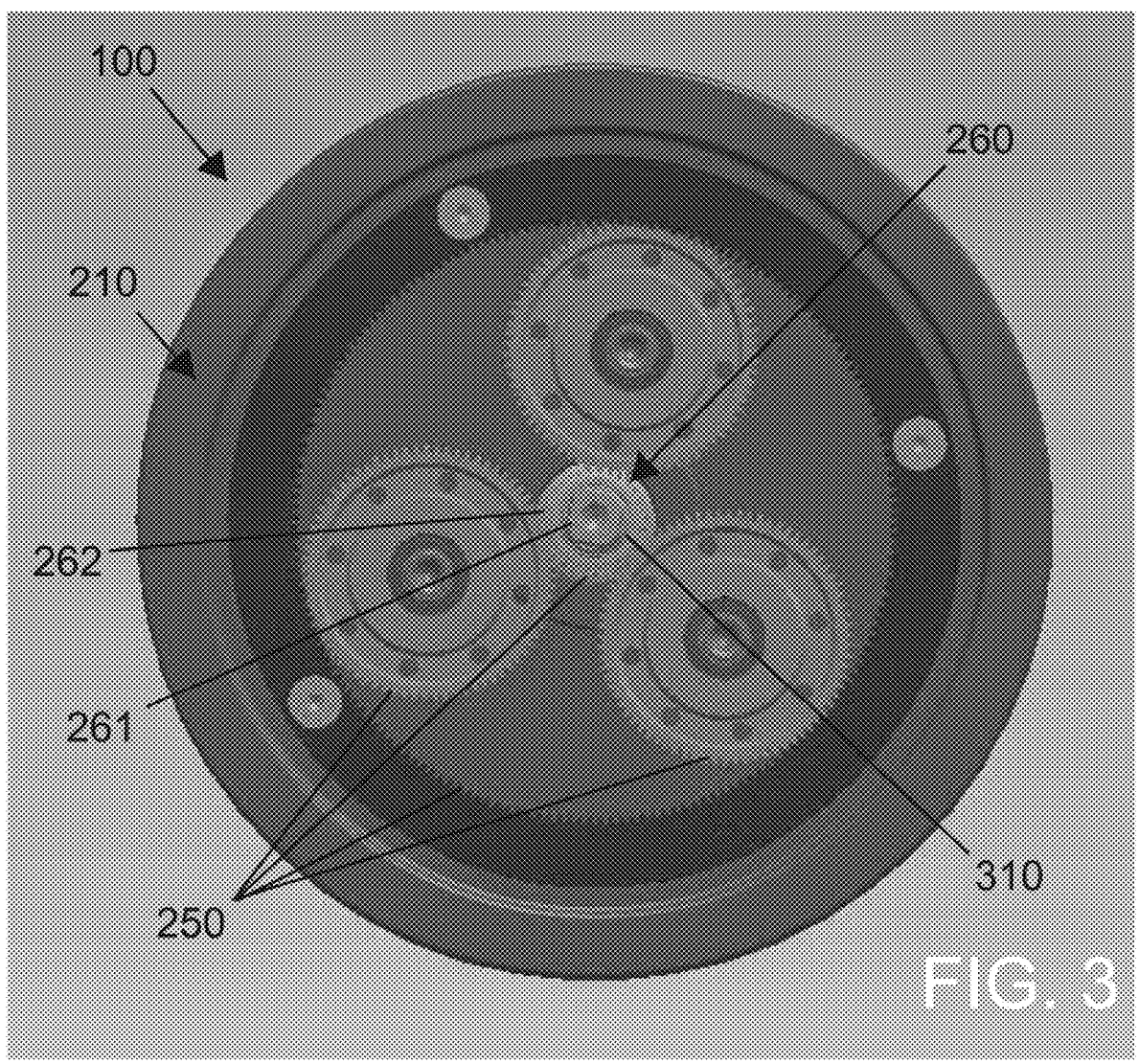
FIG. 3 shows a front view of the present invention with the planet carrier removed.
Figure 4:
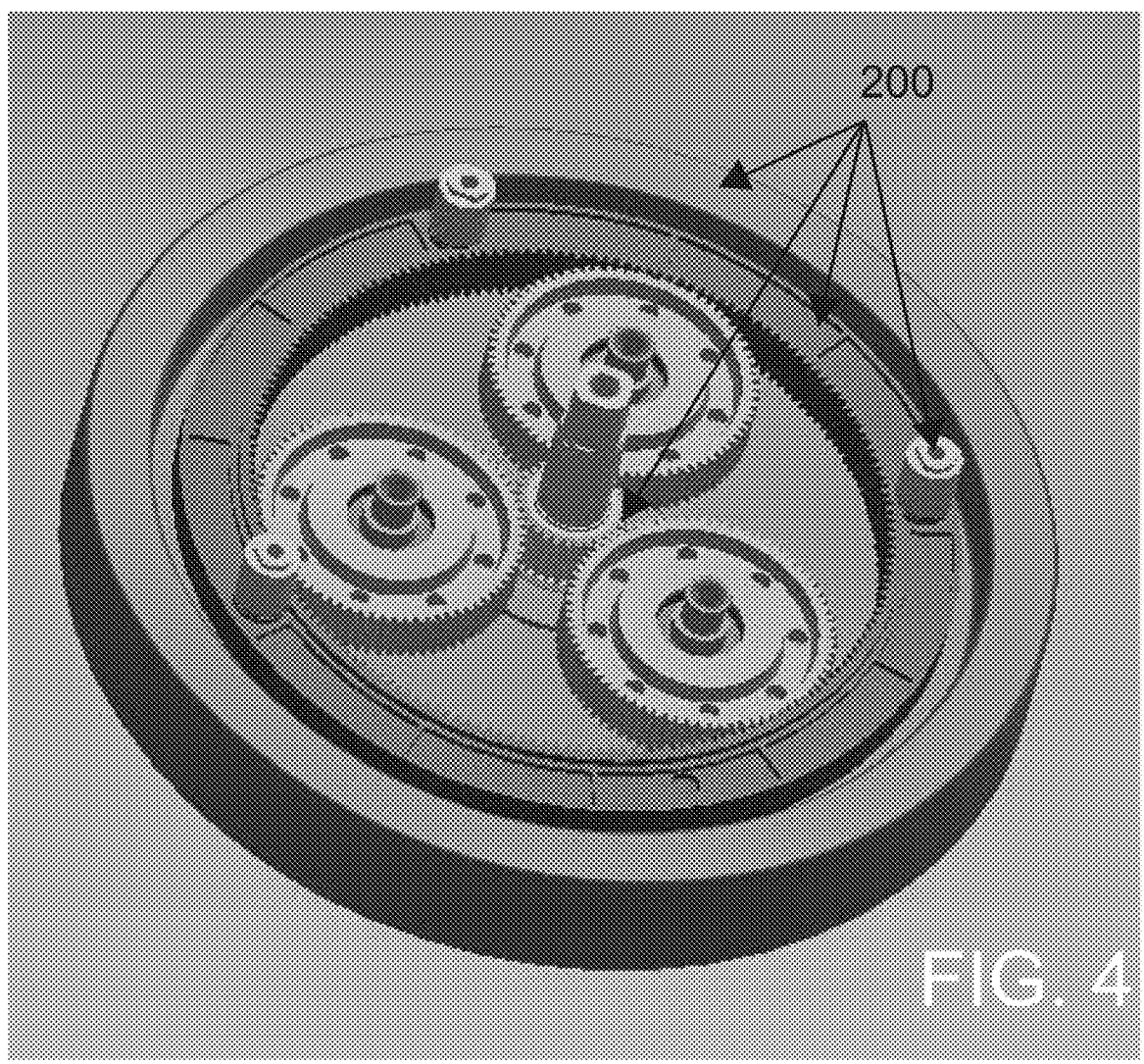
FIG. 4 shows a perspective view of the present invention with the planet carrier removed.
Figure 5:
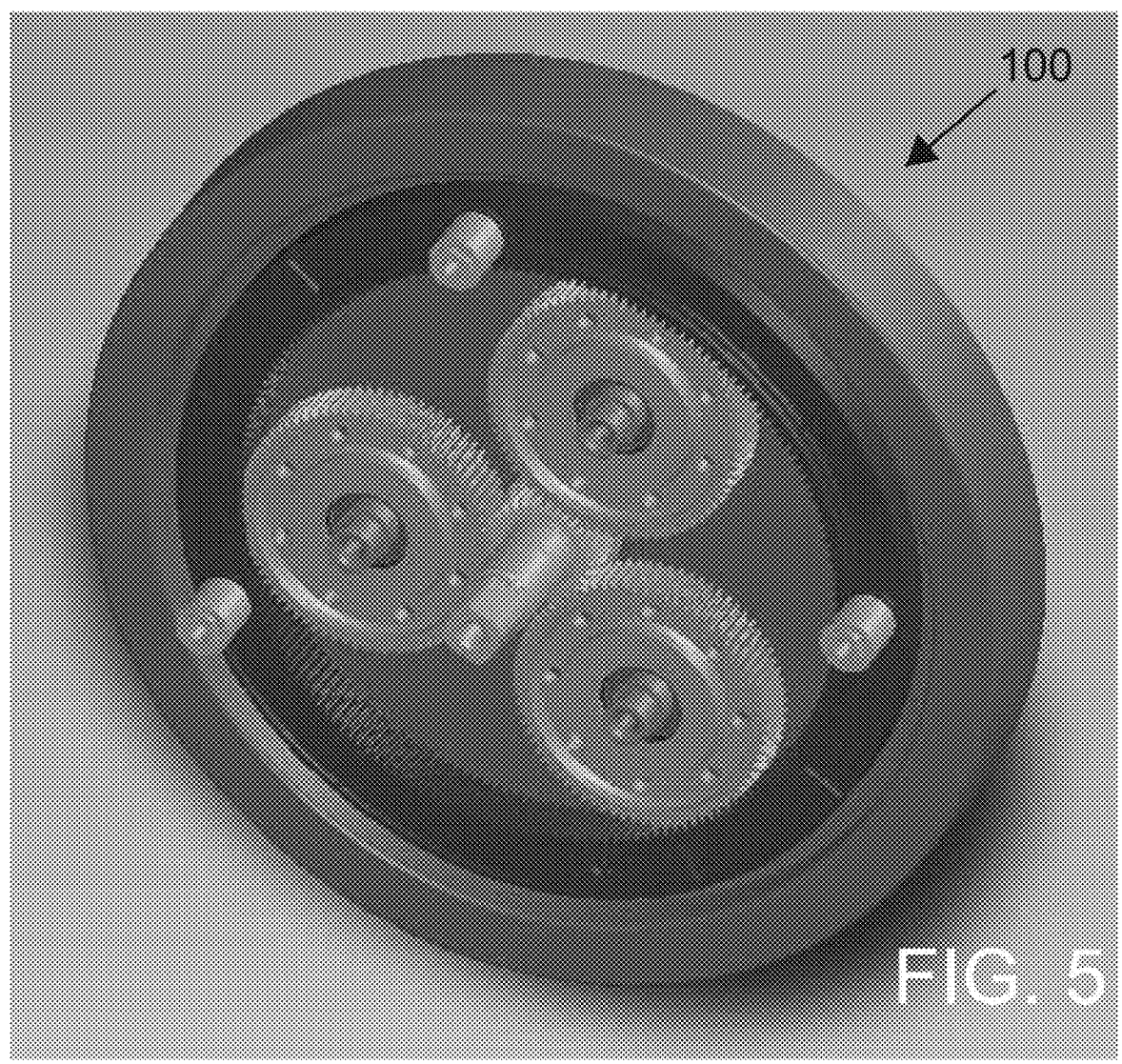
FIG. 5 shows a perspective view of the present invention with the planet carrier removed.
Figure 6:
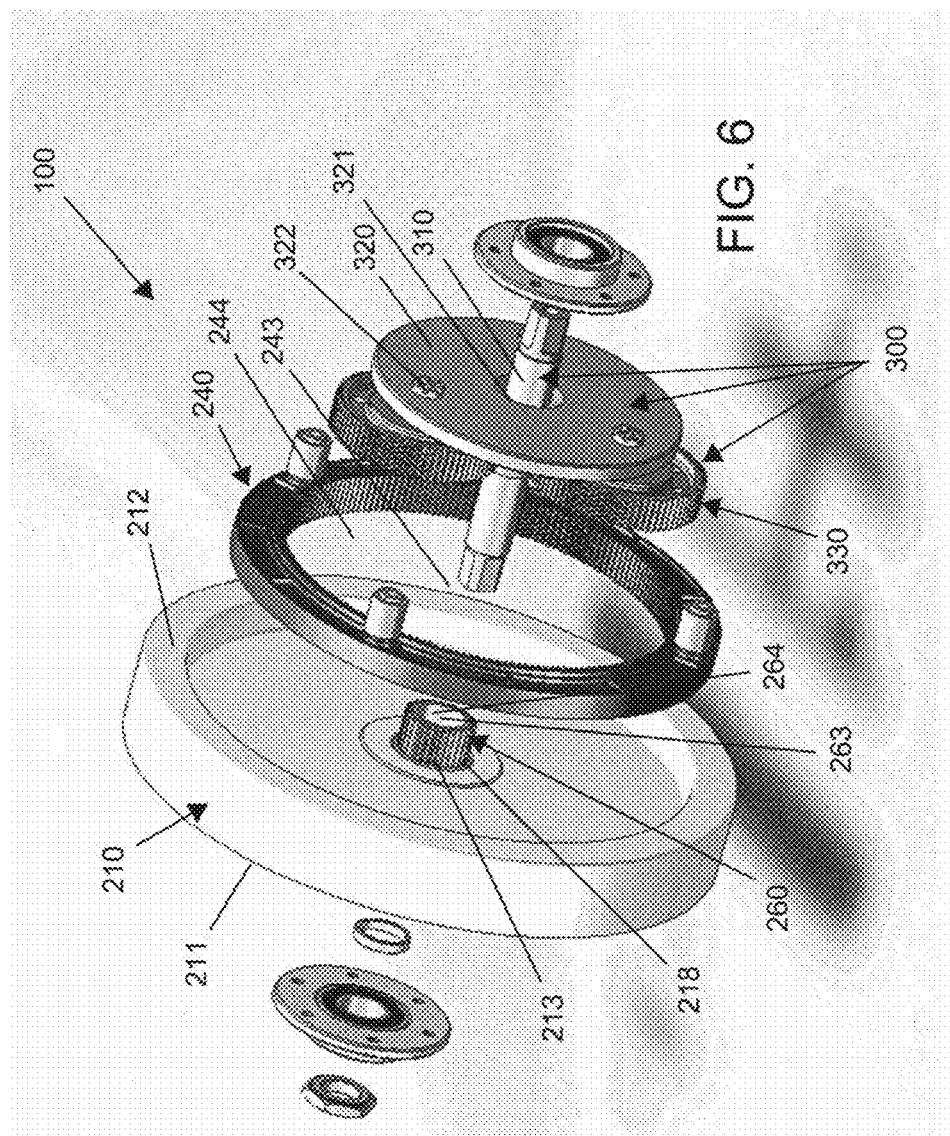
FIG. 6 shows an exploded view of the components of the present invention.
Figure 7:
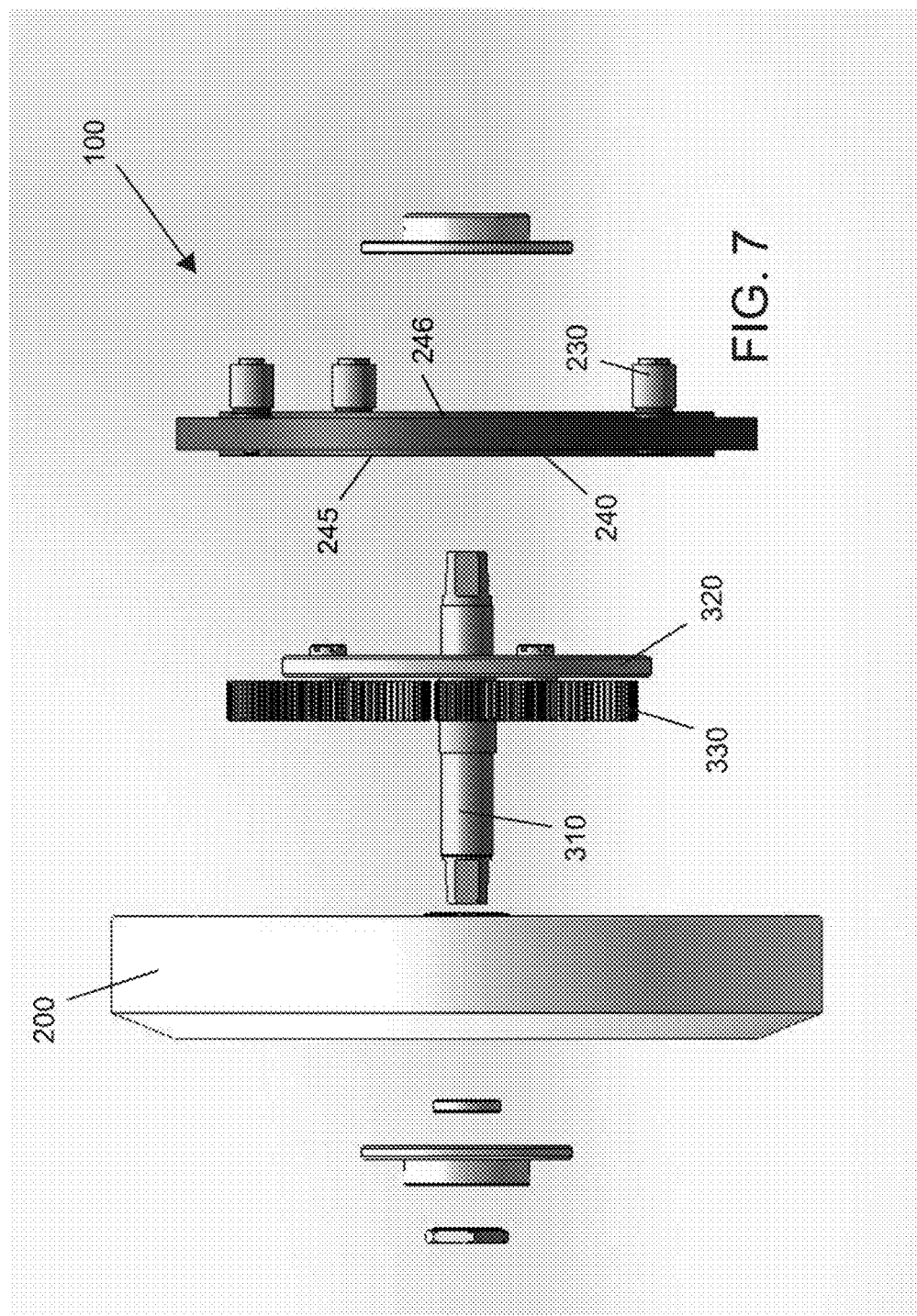
FIG. 7 shows an exploded side view of the components of the present invention.
Figure 8:
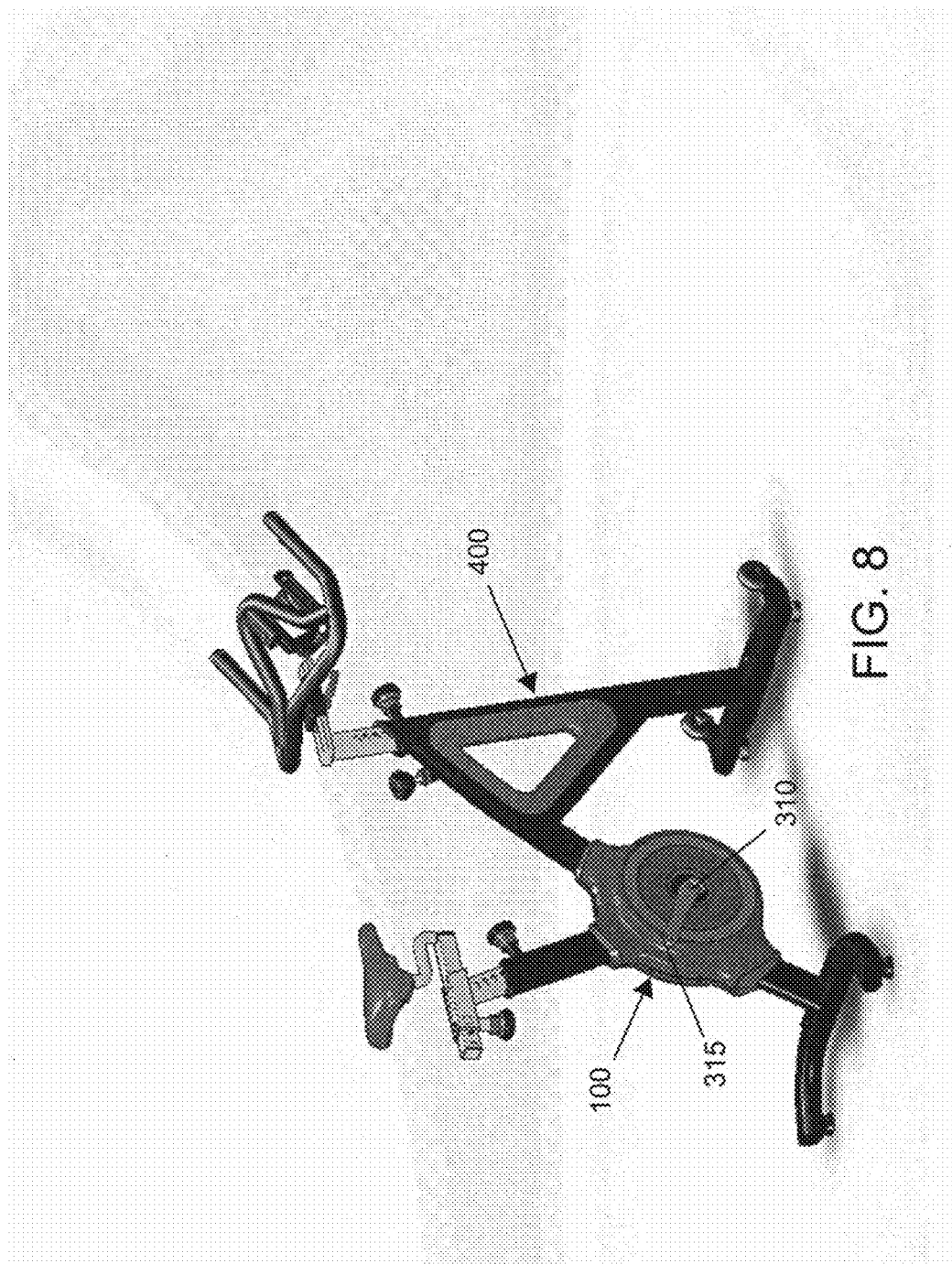
FIG. 8 shows a perspective view of an alternate embodiment of the present invention integrated into an exercise machine.
Figure 9:
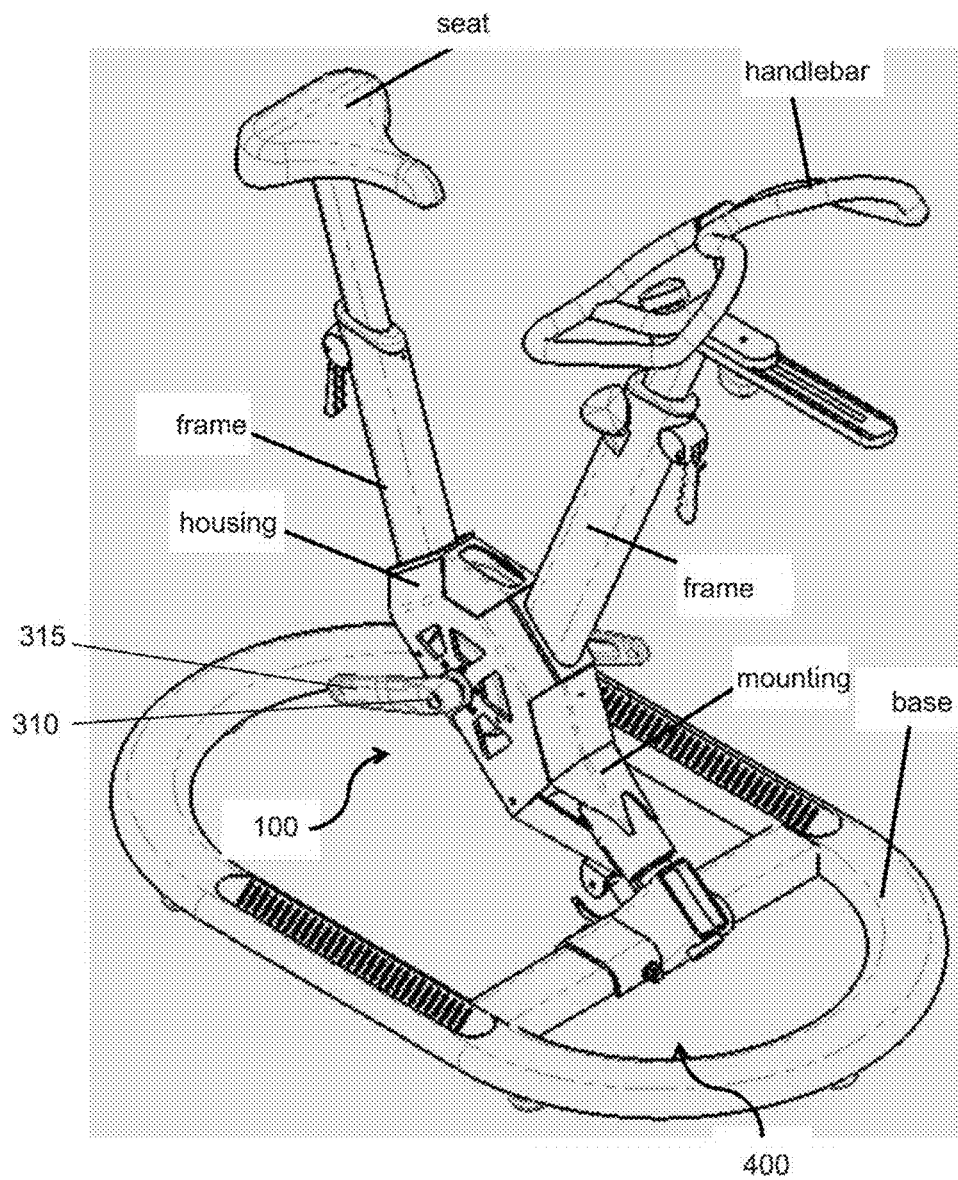
FIG. 9 shows a perspective view of an alternate embodiment of the present invention integrated into an exercise machine.
Figure 10:
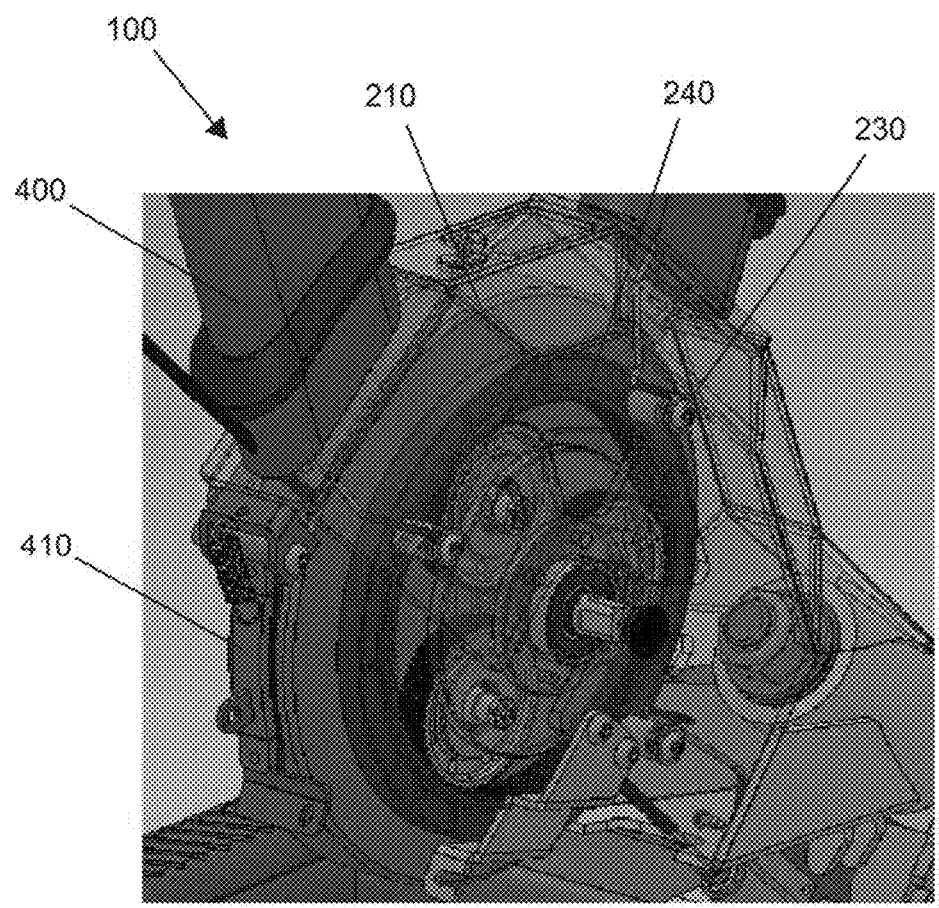
FIG. 10 shows a perspective view of the present invention integrated into an exercise machine featuring a ring gear mounted to a frame via mounting pillars.

Following is a list of elements corresponding to a particular element referred to herein:
100 Epicyclic gear system
200 Flywheel assembly
210 Flywheel
211 First flywheel side
212 Second flywheel side
213 Flywheel center
214 Flywheel outer periphery
215 Flywheel side lip
216 Flywheel radial edge
218 Axle aperture
220 Flywheel cavity
221 Cavity bottom 222 Cavity outer periphery
230 Mounting pillar
240 Ring gear
241 Ring gear inner periphery
242 Ring gear outer periphery
243 Ring gear center
244 Ring gear aperture
245 First ring gear side
246 Second ring gear side
250 Gear teeth
260 Sun gear
261 Sun gear inner periphery
262 Sun gear outer periphery
263 Sun gear center
264 Sun gear aperture
300 Planet gear assembly
310 Axle shaft
315 Crank
320 Planet carrier
321 Carrier inner mounting component
322 Carrier outer mounting component
330 Planet gear
400 Exercise machine
410 Resistance brake
420 Ring gear assembly Referring now to FIG. 1-10, the present invention features an epicyclic gear system (100). In some embodiments, the epicyclic gear system (100) comprises a flywheel assembly (200). In some embodiments, the flywheel assembly (200) comprises a cylindrical flywheel (210) having a planar first flywheel side (211), a second flywheel side (212), a flywheel center (213), and a flywheel outer periphery (214). In some embodiments, the flywheel (210) is solid. In some embodiments, the flywheel (210) is hollow. In some embodiments, the flywheel (210) comprises one or more cavities or apertures disposed therein for weight reduction.

In some embodiments, the flywheel (210) may resemble standard flywheels (210) used in stationary bicycles, which are well known to one of ordinary skill in the art. In some embodiments, the flywheel (210) is generally circular in shape (e.g., a flat circle, e.g., with a flywheel outer periphery (214), a flywheel center (213), a flywheel first side (surface) (211), and a flywheel second side (surface) (212). In some embodiments, the flywheel (210) also serves as a resistance means when a friction or resistance brake pad is applied to the outer surface of the spinning flywheel (210). In some embodiments, this provides a greater resistance to the user, for workouts of varying and increased effort levels.

In some embodiments, the flywheel (210) may be constructed in various sizes and weights. For example, in some embodiments, the flywheel (210) weighs less than about 10 pounds. In some embodiments, the flywheel (210) weighs between about 10 to 20 pounds. In some embodiments, the flywheel (210) weighs between about 20 to 30 pounds. In some embodiments, the flywheel (210) weighs between about 30 to 40 pounds. In some embodiments, the flywheel (210) weighs between about 40 to 50 pounds. In some embodiments, the flywheel (210) weighs between about 50 to 60 pounds. In some embodiments, the flywheel (210) weighs between about 60 to 70 pounds. In some embodiments, the flywheel (210) weighs between about 70 to 80 pounds. In some embodiments, the flywheel (210) weighs more than about 80 pounds. In some embodiments, the flywheel (210) may weigh from 5 to 65 lbs, depending on the gear ratio selected and the inertial "feel" preferred in the design process. The present invention is not limited to the aforementioned flywheel (210) weights.

In some embodiments, the flywheel (210) is between about 4 and 8 inches in diameter. In some embodiments, the flywheel (210) is between about 8 and 10 inches in diameter. In some embodiments, the flywheel (210) is between about 10 and 12 inches in diameter. In some embodiments, the flywheel (210) is between about 12 and 16 inches in diameter. In some embodiments, the flywheel (210) is between about 16 and 20 inches in diameter. In some embodiments, the flywheel (210) is more than 20 inches in diameter. In some embodiments, the flywheel (210) is less than 8 inches in diameter. In some embodiments, the limits of the flywheel (210) size are may be a function of the overall design of the exercise machine (400). The present invention is not limited to the aforementioned sizes of the flywheel (210).

In some embodiments, the flywheel (210) is between about ½ inch and 1 inch in thickness. In some embodiments, the flywheel (210) is between about 1 inch and 2 inches in thickness. In some embodiments, the flywheel (210) is less than ½ inch in thickness. In some embodiments, the flywheel (210) is greater than 2 inches in thickness.

In some embodiments, a cylindrical flywheel cavity (220) having a planar cavity bottom (221) is centrally located on the second flywheel side (212). In some embodiments, the cavity bottom (221) is located on a plane parallel to and offset from the second flywheel side (212). In some embodiments, a flywheel side lip (215) is located on the second flywheel side (212) next to and between the flywheel outer periphery (214) and a cavity outer periphery (222). In some embodiments, the flywheel cavity (220) houses or encloses components of the epicyclic gear system (100).

In some embodiments, the flywheel cavity (220) is between about 4 and 8 inches in diameter. In some embodiments, the flywheel cavity (220) is between about 8 and 10 inches in diameter. In some embodiments, the flywheel cavity (220) is between about 10 and 12 inches in diameter. In some embodiments, the flywheel cavity (220) is between about 12 and 16 inches in diameter. In some embodiments, the flywheel cavity (220) is between about 16 and 20 inches in diameter. In some embodiments, the flywheel cavity (220) is more than 20 inches in diameter. In some embodiments, the flywheel cavity (220) is less than 8 inches in diameter. In some embodiments, the limits of the flywheel cavity (220) size are may be a function of the overall design of the exercise machine (400). The present invention is not limited to the aforementioned sizes of the flywheel cavity (220).

In some embodiments, the flywheel cavity (220) from the second flywheel side (212) to the cavity bottom (221) is between about ½ inch and 1 inch in depth. In some embodiments, the flywheel cavity (220) from the second flywheel side (212) to the cavity bottom (221) is between about 1 inch to 2 inches in depth. In some embodiments, the flywheel cavity (220) from the second flywheel side (212) to the cavity bottom (221) is greater than 2 inches in depth.

In some embodiments, the features of the flywheel cavity (220) are critical to the present invention.

In some embodiments, an axle aperture (218) is located in the flywheel center (213) from the first flywheel side (211) to the cavity bottom (221) on the second flywheel side (212).

In some embodiments, a flat flywheel radial edge (216) is located on the flywheel outer periphery (214) for a braking interface.

In some embodiments, a grooved flywheel radial edge (216), like a track, is located on the flywheel outer periphery (214) for a braking interface. In some embodiments, the grooved flywheel radial edge (216) provides more surface area for a braking interface. In some embodiments, a ridged flywheel radial edge (216), like a track, is located on the flywheel outer periphery (214) for a braking interface. In some embodiments, the ridged flywheel radial edge (216) provides more surface area for a braking interface. In some embodiments, a textured flywheel radial edge (216) is located on the flywheel outer periphery (214) for a braking interface. In some embodiments, a flat first flywheel side (211) is located on the flywheel (210) for a braking interface. In some embodiments, a flat second flywheel side (212) is located on the flywheel (210) for a braking interface.

In some embodiments, the ring gear assembly (420) comprises an annular ring gear (240) having a ring gear inner periphery (241), a ring gear outer periphery (242), a first ring gear side (245), and a second ring gear side (246). In some embodiments, a ring gear aperture (244) is located in a ring gear center (243). In some embodiments, gear teeth (250) are located around the ring gear (240). In some embodiments, the ring gear (240) projects into the flywheel cavity (220) where it is enclosed by the flywheel (210). Preferably, the first ring gear side (245) faces the flywheel cavity (220).

In some embodiments, the ring gear (240) is constructed from a glass fiber reinforced polymer such as Polyamide 66 (PA66), a nylon polymer with 10% to 20% glass fiber (for example 15%). In some embodiments, the use of a polymer is critical to the present invention. In some embodiments, the use of glass fiber for reinforcement is critical to the present invention.

In some embodiments, the ring gear assembly (420) comprises a plurality of cylindrical mounting pillars (230) disposed on and projecting from the second ring gear side (246). For instance, the ring gear assembly (420) comprises at least two mounting pillars (230), or at least three mounting pillars (230). The mounting pillars (230) are configured to connect to a frame of an exercise machine (400) such that the ring gear (240) is disposed on the frame of the exercise machine (400) via the mounting pillars (230). As a non-limiting example, the ring gear (240) is attached, i.e. mounted, onto the frame by fasteners, such as bolts or screws. The fasteners are inserted through apertures of the frame, which are aligned with the mounting pillars, and threaded into the mounting pillars.

In other embodiments, the ring gear assembly (420) comprises a plurality of cylindrical mounting pillars (230) mounted to a frame of the exercise machine (400). In some embodiments, the ring gear (240) is located on the frame of the exercise machine (400) via the cylindrical mounting pillars (230) extending through and fastening to apertures located in the ring gear (240).

In some embodiments, the mounting pillars (230) are constructed from a structure comprising a hardened steel and a thermoplastic compound that absorbs vibration, reduces noise and can withstand high temperatures. In some embodiments, the size, shape, and positioning of the mounting pillars (230) can be varied based on the specific design of the exercise machine (400). In some embodiments, the mounting pillars (230) are constructed from a polyurethane to absorb vibration.

In some embodiments, the flywheel assembly (200) comprises an annular sun gear (260) having a sun gear inner periphery (261) and a sun gear outer periphery (262). In some embodiments, a sun gear aperture (264) is located in a sun gear center (263). In some embodiments, the sun gear (260) is affixed to and concentrically located on the cavity bottom (221) in the flywheel cavity (220). In some embodiments, the sun gear (260) extends out and away from cavity bottom (221). In some embodiments, gear teeth (250) are located around the sun gear outer periphery (262).

In some embodiments, the sun gear (260) is constructed from a powdered metal such as a brass and bronze material, a high temperature steel for higher strength and ductility, a carbon steel, a copper steel, or a soft magnetic iron.

In some embodiments, a sun gear (260) is rotatingly located (not fixedly) on an axle shaft (310). In some embodiments, the sun gear (260) is fixedly attached to the flywheel (210). In some embodiments, the sun gear (260) has a sun gear center (263) that aligns with the flywheel center (213), and the axle shaft (310) traverses both an axle aperture (218) of the flywheel (210) and the sun gear aperture (264) of the sun gear (260). In some embodiments, like the flywheel (210), the sun gear (260) rotates independently of the axle shaft (e.g., the flywheel (210) and the sun gear (260) rotate together because the two are fixedly attached).

In some embodiments, the epicyclic gear system (100) comprises a planet gear assembly (300). In some embodiments, the planet gear assembly (300) comprises an axle shaft (310).

In some embodiments, traversing the center of the flywheel (210) is the axle shaft (310). The axle shaft (310) can rotate independently of the flywheel (210) (e.g., the axle shaft (310) and flywheel (210) are not fixedly attached). In some embodiments, the axle shaft (310) has a first end and a second end. In some embodiments, the first end of the axle shaft (310) protrudes from the first flywheel side (211) and the second end of the axle shaft (310) protrudes from the second flywheel side (212). In some embodiments, a first crank (315) is located on the first end of the axle shaft (310), and a second crank (315) is located on the second end of the axle shaft (310).

In some embodiments, the planet gear assembly (300) comprises a planet carrier (320) having a carrier inner mounting component (321) and one or more carrier outer mounting components (322). In some embodiments, the carrier inner mounting component (321) is fixedly located on the axle shaft (310).

In some embodiments, the planet carrier (320) is fixedly attached to the axle shaft (310). In some embodiments, the planet carrier (320) has a carrier inner mounting component (321) and the axle shaft (310) traverses its center. In some embodiments, rotation of the axle shaft (310) in the first direction causes rotation of the planet carrier (320) in the first direction, and rotation of the axle shaft (310) in the second direction causes rotation of the planet carrier (320) in the second direction. In some embodiments, the planet carrier (320) may be constructed in a variety of shapes. In some embodiments, the planet carrier (320) has a generally circular or round shape. In some embodiments, the planet carrier (320) has a generally triangular shape. In some embodiments, the planet carrier (320) has a generally square/rectangular shape. In some embodiments, the planet carrier (320) has a generally pentagonal shape. The planet carrier (320) is not limited to the aforementioned shapes as it may have a linear shape or a shape of a "Y" or an "X".

In some embodiments, the planet gear assembly (300) comprises one or more planet gears (330) rotatably located on one or more carrier outer mounting components (322).

In some embodiments, the planet gear (330) is constructed from polyoxymethylene (POM), also known as acetal polyacetal and polyformaldehyde. In some embodiments, (POM) is an engineering thermoplastic used in precision parts requiring high stiffness, low friction and excellent dimensional stability. In some embodiments, as with many other synthetic polymers, it is produced by different chemical firms with slightly different formulas and sold variously by such names as Delrin™, Celcon™, Duracon™ and Hostaform™. In some embodiments, the epicyclic gear system (100) of the present invention further comprises planet gears (330) located on the planet carrier (320). In some embodiments, the epicyclic gear system (100) comprises one planet gear (330). In some embodiments, the epicyclic gear system (100) comprises two planet gears (330). In some embodiments, the epicyclic gear system (100) comprises three planet gears (330). In some embodiments, the epicyclic gear system (100) comprises four planet gears (330). In some embodiments, the epicyclic gear system (100) comprises five planet gears (330). In some embodiments, the epicyclic gear system (100) comprises six planet gears (330). In some embodiments, the epicyclic gear system (100) comprises seven planet gears (330). In some embodiments, the epicyclic gear system (100) comprises eight planet gears (330). In some embodiments, the epicyclic gear system (100) comprises nine planet gears (330). In some embodiments, the epicyclic gear system (100) comprises ten planet gears (330). In some embodiments, the epicyclic, gear system (100) comprises more than ten planet gears (330) (e.g., eleven, twelve, thirteen, fourteen, fifteen, sixteen, seventeen, eighteen, nineteen, twenty, more than twenty, etc.).

In some embodiments, a first planet gear (330) is rotatably attached to a first position on the planet carrier (320)—a first carrier outer mounting component (322), a second planet gear (330) is rotatably attached to a second position on the planet carrier (320)—a second carrier outer mounting component (322), and a third planet gear (330) is rotatably attached to a third position on the planet carrier (320)—a third carrier outer mounting component (322). In some embodiments, the planet gears (330) are not fixedly attached to the planet carrier (320) and can rotate independently of the planet carrier (320). In some embodiments, the planet gears (330) can rotate with respect to the planet carrier (320) about their respective carrier outer mounting components (322) or axles.

In some embodiments, the planet gears (330) may be arranged in any configuration on the planet carrier (320). In some embodiments, the planet gears (330) are arranged asymmetrically on the planet carrier (320). In some embodiments, the planet gears (330) are arranged and spaced symmetrically on the planet carrier (320). In some embodiments, the first carrier outer mounting component (322) on the planet carrier (320) is equidistant from the second carrier outer mounting component (322) and the third carrier outer mounting component (322) on the planet carrier (320), and the second carrier outer mounting component (322) on the planet carrier (320) is equidistant from the first carrier outer mounting component (322) and the third carrier outer mounting component (322) on the planet carrier (320). In some embodiments, the present invention is in no way limited to this configuration.

In some embodiments, each planet gear (330) comprises a small planet gear (330) fixed to a large planet gear (330), also known as a compound planet gear (330). In some embodiments, the planet gears (330) are not limited to this compound configuration. In some embodiments, each small planet gear (330) and each large planet gear (330) has a center, and the centers of small planet gears (330) are aligned with the respective centers of the large planet gears (330). In some embodiments, the carrier outer mounting component (322) traverses the centers of its respective small planet gears (330) and large planet gears (330). In some embodiments, the small planet gears (330) are smaller than their respective large planet gears (330), thus each small planet gear (330) has a diameter that is smaller than that of its respective large planet gear (330). In some embodiments, the compound planet gears (330) may be replaced with single planet gears (330) (e.g., single planet gears (330) that engage and mesh with the sun gear (260) and/or ring gear (240)).

In some embodiments, the planet gears (330) are not compound planet gears (330) (e.g., the combination of the large planet gears (330) and small planet gears (330) as described above). In some embodiments, as described above, the sun gear (260) is fixedly attached to the flywheel (210), and the planet carrier (320) is fixed to the axle shaft (310). In some embodiments, one or more planet gears (330) (e.g., two, three, four, five, six, etc.) are located on the planet carrier (320) (e.g., via carrier outer mounting components (322)). In some embodiments, the planet gears (330) can rotate independently of the planet carrier (320). In some embodiments, surrounding the planet gears (330) is the ring gear (240). In some embodiments, the gear teeth (250) of the ring gear (240) engage the planet gears (330). In some embodiments, the planet gears (330) are positioned such that their outer surfaces engage the gear teeth (250) on the sun gear outer periphery (262). In some embodiments, when the cranks (315) and axle shaft (310) rotate in a first direction, the planet carrier (320) in turn rotates in the first direction. In some embodiments, this causes the planet gears (330) to rotate in the second direction within the ring gear (240). In some embodiments, rotation of the planet gears (330) in the second direction drives the rotation of the sun gear (260) and flywheel (210) in the first direction.

In some embodiments, the flywheel assembly (200), the planet gear assembly (300), and the ring gear assembly (420) are interfacingly assembled together. In some embodiments, the axle shaft (310) rotatingly passes through the axle aperture (218), the ring gear aperture (244), and the sun gear aperture (264). In some embodiments, the planet gear (330) engages the ring gear (240) and the sun gear (260) to provide a desired gear ratio for rotating the flywheel (210) via rotation of the axle shaft (310), the planet carrier (320), the planet gear (330), and the sun gear (260).

In some embodiments, each small planet gear (330) engages the ring gear (240) and each large planet gear (330) engages the sun gear (260). In some embodiments, each large planet gear (330) has a set of gear teeth (250) located on its outer edge (outer surface) that engage a set of gear teeth (250) located the sun gear outer periphery (262). In some embodiments, each small planet gear (330) has a set of gear teeth (250) located on an outer edge (outer surface) that engage a set of gear teeth (250) located on the ring gear inner periphery (241). In some embodiments, the present invention is not limited to engagement of the gears via gear teeth (250); for example, in some embodiments, the large planet gears (330) engage the sun gear (260) via friction. In some embodiments, the small planet gears (330) engage the ring gear (240) via friction.

In some embodiments, when the axle shaft (310) is rotated in a first direction (via the cranks (315)), the planet carrier (320) also rotates in the first direction (e.g., the planet carrier (320) is fixedly attached to the axle shaft (310)). In some embodiments, rotation of the planet carrier (320) in the first direction causes each small planet gear (330) to rotate in the second direction (opposite the first direction) within the ring gear (240) and each large planet gear (330) to rotate in the second direction (opposite the first direction) about/around the sun gear (260). In some embodiments, rotation of the small planet gears (330) and the large planet gears (330) in the second direction causes the sun gear (260) and flywheel (210) to together rotate in the first direction (the flywheel (210) rotates in the same direction as the cranks (315)).

In some embodiments, the epicyclic gear system (100) of the present invention provides a speed increase ratio. In some embodiments, as used herein, the term "speed increase ratio" refers to the number of rotations of the flywheel (210) compared to the number of rotations of the crank (315). In some embodiments, a speed increase ratio of 11:1 refers to 11 rotations of the flywheel (210) per 1 rotation of the crank (315).

In some embodiments, the speed increase ratio is between about 1:1 to about 20:1. In some embodiments, the speed increase ratio is at least about 1:1. In some embodiments, the speed increase ratio is about 11:1. In some embodiments, the speed increase ratio is about 2:1. In some embodiments, the speed increase ratio is about 5:1. In some embodiments, the speed increase ratio is about 8:1. In some embodiments, the speed increase ratio is about 10:1. In some embodiments, the speed increase ratio is about 12:1. In some embodiments, the speed increase ratio is about 15:1. In some embodiments, the speed increase ratio is about 20:1. In some embodiments, the speed increase ratio is at least about 20:1.

In some embodiments, gear teeth (250) are located around the ring gear inner periphery (241). In some embodiments, gear teeth (250) are located around the ring gear outer periphery (242).

In some embodiments, the epicyclic gear system (100) further comprises three planet gears (330) rotatably mounted on three outer mounting components (322).

In some embodiments, a crank (315) is fixed to the axle shaft (310). In some embodiments, a first crank (315) and a second crank (315) are fixed to the axle shaft (310), one on each end. In some embodiments, the axle shaft (310) is rotated via one or more cranks (315).

In some embodiments, the epicyclic gear system (100) further comprises an exercise machine (400). In some embodiments, the epicyclic gear system (100) is mounted to and integrated into the exercise machine (400) for providing resistance to a user for exercise.

In some embodiments, the exercise machine (400) is a bicycle located on a stationary stand. In some embodiments, the epicyclic gear system (100) of the present invention is used in exercise equipment, for example a stationary bicycle assembly. In some embodiments, the epicyclic gear system (100) is integrated into a bicycle frame. In some embodiments, a housing and (or) the ring gear (240) is fixed to the frame (or in the frame), providing support and resistance against which the epicyclic gear system (100) can rotate the flywheel (210). In some embodiments, as in standard stationary bicycles, the bicycle assembly may comprise a handlebar assembly and a seat assembly. In some embodiments, the bicycle frame comprises a first extension adapted to support the handlebar assembly. In some embodiments, the bicycle frame comprises a second extension adapted to support the seat assembly. In some embodiments, the handlebar assembly and seat assembly may be various configurations and systems including but not limited to standard handlebar assemblies and seat assemblies well known to one of ordinary skill in the art. In some embodiments, the epicyclic gear system (100) of the present invention may also be used in a "recumbent" style bike, in which the user is situated in a seat or saddle substantially behind the pedal crank set, rather than above them. In some embodiments, the user is seated in a chair-like arrangement, and the frame of the exercise machine (400) is designed to accommodate such a position, with handlebars, seat backrest, and other features suitably arranged.

In some embodiments, the stationary bicycle assembly comprises a base to which the bicycle frame is attached. In some embodiments, the base is generally oval in shape, however the base is not limited to this shape (e.g., the base may be circular in shape, rectangular in shape, "H" shaped, "I" shaped, "X" shaped, etc.). In some embodiments, the bicycle frame may comprise a lower extension that connects to the base.

In some embodiments, the exercise machine (400) comprises a resistance brake (410). In some embodiments, the resistance brake (410) comprises a leather interface surface for adjustably interfacing with the flywheel radial edge (216) of the flywheel outer periphery (214). In some embodiments, a resistance brake (410) is mounted to the frame or housing of the exercise machine (400). In some embodiments, the friction brake pad of the resistance brake (410) may be pressed with a user adjustable force against the flywheel radial edge (216) to provide braking resistance to the epicyclic gear system (100), allowing the user to add and adjust resistance to the epicyclic gear system (100) and vary the amount of effort required to rotate the pedals. In some embodiments, the brake pad or pads may be made of a suitable material such as leather to provide a long wearing means of frictional braking action to the surface or surfaces of the flywheel (210). In some embodiments, the brake pad or pads are not limited to this construction.

In some embodiments, a housing is rotatably mounted on the axle shaft (310) in between the flywheel (210) and the second crank (315) (or the first crank (315)). In some embodiments, the axle shaft (310) is not fixedly attached to the housing; the axle shaft (310) rotates independently of the housing. In some embodiments, the housing remains fixed and the axle shaft (310) rotates in a first direction and/or a second direction with respect to the housing. In some embodiments, a ring gear (240) is housed in the housing and is fixedly attached to the housing. In some embodiment, the ring gear (240) is positioned around the planet gears (330), however the present invention is not limited to this configuration. In some embodiments, the ring gear (240) is positioned around all or a portion of the planet gears (330) that are located on the planet carrier (320).

In some embodiments, the flywheel (210) rotates about the axle shaft (310) via bearings. In some embodiments, the axle shaft (310) rotates within the housing via bearings.

In some embodiments, the ring gear (240) (e.g., with gear teeth (250) on the ring gear inner periphery (241)) may be replaced by a ring gear (240) with gear teeth (250) on the ring gear outer periphery (242), mounted on the same axis. The ring gear (240) would still engage or mesh with the planet gear (330), but on the side of the planet gear (330) facing toward the axle shaft (310) (instead of the side facing opposite the axle shaft (310) as described above). This arrangement causes the planet gears (330) to turn in the same rotational direction as the planet carrier (320), and the sun gear (260) to turn in the opposite rotational direction.

In some embodiments, the planet carrier (320) is rigidly attached to frame supports (e.g., the two housings, may be supported by bearings), and the ring gear (240) is fixedly attached to the axle shaft (310). In some embodiments, in this configuration, the planet carrier (320) is fixed and does not rotate, and therefore the planet gears (330) do not orbit around the main axle shaft (310). In some embodiments, when the cranks (315) are rotated, the ring gear (240) rotates, too (the ring gear (240) is fixedly attached to the axle shaft (310)), causing the planet gears (330) to rotate around their respective carrier outer mounting components (322). In some embodiments, the planet gears (330), being engaged with (in mesh with) the sun gear (260), causes the sun gear (260) to rotate, and therefore the flywheel (210) rotates because the flywheel (210) is fixedly attached to the sun gear (260).

Without wishing to limit the present invention to any theory or mechanism, it is believed that the epicyclic gear system (100) of the present invention is advantageous because it eliminates a need for adjustment of a chain or belt. For example, many exercise machines use a chain or a belt drive assembly to transfer the rotary motion of the pedals and cranks (315) to a flywheel (210). Both belts and chains often require a way to adjust the center distance (the distance between the driver and the driven axles) to keep the system working properly. A belt that is too loose will slip, and cause a loss of transferred energy and torque. Similarly, a chain that is too loose will skip teeth, make noise, or even come completely off the chain rings. Conversely, if the chain or belt is too tight, it can cause pre-mature wear and breakage. Both chains and belts can stretch out and wear over time and usage, causing the need to adjust them periodically during their useful life. This costs the owner time and money. Because the epicyclic gear system (100) of the present invention does not utilize a belt or chain, no adjustment is needed for proper operation, eliminating the need for periodic maintenance or failures due to lack of maintenance. Also, because of the compact nature of the epicyclic gear system (100), there are no exposed external moving parts to get fouled or caught, as a chain drive is prone to do.

Without wishing to limit the present invention to any theory or mechanism, it is believed that the epicyclic gear system (100) of the present invention is advantageous because it allows for a higher gear ratio. For example, many exercise machines have a belt or chain drive to transfer rotary motion from the pedal crank axle shaft (310) to the flywheel (210). The purpose of having a flywheel (210) on an exercise machine is to add rotational inertia to the drive assembly, providing the user with a feeling of resistance when he accelerates, and maintaining the speed of the epicyclic gear system (100) when the user is not applying pedal force (such as at the top and bottom of each pedal stroke). The physical inertia of the flywheel (210) is determined by its weight and configuration. The amount of inertia the rider feels at the pedal crank (315) axle is determined by the motion ratio (or gear ratio as it may be called) between the pedal crank (315) and the flywheel (210). For a fixed weight flywheel (210), the higher the gear ratio, the higher the inertia felt at the pedals. Most chain driven exercise machines are limited to a gear ratio of about 3.25:1 by the practical size of the pedal crank (315) and the flywheel (210). With this ratio, a flywheel (210) of approximately 45 lbs and 20 inches in diameter must be used to comfortably simulate an acceptable amount of pedal inertia. The epicyclic gear system (100) of the present invention can achieve a much higher gear ratio in a smaller, more compact space. With a gear ratio of 11:1, for example, the required weight of the flywheel (210) is only about 8 lbs and 12 inches in diameter, to have the same pedal inertia feel as a chain driven exercise machine (400) with a 45*lb* flywheel (210). This is an advantage for many things, including manufacturing cost, shipping, and mobility of the exercise machine.

Without wishing to limit the present invention to any theory or mechanism, it is believed that the epicyclic, gear system (100) of the present invention is advantageous because the co-axial operation of cranks (315) and flywheel (210) is compact and allows for design freedom. For example, many exercise machines (400) have a belt or chain drive to transfer rotary motion from the pedal crank axle shaft (310) to the flywheel (210). The required center distance between the pedal crank axle shaft (310) and flywheel (210) may be greater than 18 inches, making the whole drivetrain with a 20 inch flywheel (210) bulky and requiring a rigid frame to support two sets of bearings for the two axles. By locating the flywheel (210) and the pedal cranks (315) on the same axle shaft (310) as in the epicyclic gear system (100) of the present invention, the entire drivetrain package can be made much more compact. The frame only needs to support only one set of bearings. With a smaller flywheel (210) allowed by the higher gear ratio as described above, the entire drivetrain, including cranks (315), transmission, and flywheel (210), can be made in a 12 inch diameter circular space. This is an advantage because of the freedom it allows in design options for the frame configuration, taking up much less space and allowing for new and different shapes for the product design.

Without wishing to limit the present invention, it is believed that the epicyclic gear system (100) is advantageous because it allows for the flywheel (210) to spin at a greater speed. This speed and energy can be harnessed for other purposes.

The epicyclic gear system (100) of the present invention may be constructed from a variety of materials. The epicyclic gear system (100) of the present invention may be constructed from a combination of materials. Examples of materials may include but are not limited to metals and/or metal alloys (e.g., stainless steel, titanium, aluminum, carbon steel, etc.), rubbers, plastics, the like, or a combination thereof.

The present invention features an epicyclic gear system (100). In some embodiments, the system (100) comprises a flywheel assembly (200). In some embodiments, the flywheel assembly (200) comprises a flywheel (210) having a first flywheel side (211), a second flywheel side (212), a flywheel center (213), and a flywheel outer periphery (214).

In some embodiments, a flywheel cavity (220) having a cavity bottom (221) is centrally located on the second flywheel side (212). In some embodiments, the cavity bottom (221) is located offset from the second flywheel side (212). In some embodiments, a flywheel side lip (215) is located on the second flywheel side (212) next to and between the flywheel outer periphery (214) and a cavity outer periphery (222).

In some embodiments, an axle aperture (218) is located in the flywheel center (213) from the first flywheel side (211) to the cavity bottom (221) on the second flywheel side (212).

In some embodiments, a flywheel radial edge (216) is located on the flywheel outer periphery (214) for a braking interface.

In some embodiments, the flywheel assembly (200) comprises a sun gear (260) having a sun gear inner periphery (261) and a sun gear outer periphery (262). In some embodiments, a sun gear aperture (264) is located in a sun gear center (263). In some embodiments, the sun gear (260) is affixed to and concentrically located on the cavity bottom (221) on the second flywheel side (212). In some embodiments, the sun gear (260) extends out and away from the cavity bottom (221). In some embodiments, gear teeth (250) are located around the sun gear outer periphery (262).

In some embodiments, the system (100) comprises a ring gear assembly (420). In some embodiments, the ring gear assembly (420) comprises a plurality of mounting pillars (230) located on a frame of an exercise machine (400).

In some embodiments, the ring gear assembly (420) comprises a ring gear (240) having a ring gear inner periphery (241) and a ring gear outer periphery (242). In some embodiments, a ring gear aperture (244) is located in a ring gear center (243). In some embodiments, gear teeth (250) are located around the ring gear (240). In some embodiments, the ring gear (240) is located on the frame of the exercise machine (400) via the mounting pillars (230). In some embodiments, the ring gear (240) projects into the flywheel cavity (220).

In some embodiments, the system (100) comprises a planet gear assembly (300). In some embodiments, the planet gear assembly (300) comprises an axle shaft (310). In some embodiments, the planet gear assembly (300) comprises a planet carrier (320) having a carrier inner mounting component (321) and a carrier outer mounting component (322). In some embodiments, the carrier inner mounting component (321) is fixedly located on the axle shaft (310). In some embodiments, the planet gear assembly (300) comprises a planet gear (330) rotatably located on the carrier outer mounting component (322).

In some embodiments, the flywheel assembly (200), the planet gear assembly (300), and the ring gear assembly (420) are interfacingly located together. In some embodiments, the axle shaft (310) rotatingly passes through the axle aperture (218), the ring gear aperture (244), and the sun gear aperture (264). In some embodiments, the planet gear (330) engages the ring gear (240) and the sun gear (260) to provide a desired gear ratio for rotating the flywheel (210) via rotation of the axle shaft (310), the planet carrier (320), the planet gear (330), and the sun gear (260).

The present invention features a flywheel for an epicyclic gear system. In some embodiments, the flywheel comprises a first flywheel side (211), a second flywheel side (212), a flywheel center (213), and a flywheel outer periphery (214). In some embodiments, the flywheel comprises a flywheel cavity (220) having a cavity bottom (221) centrally located on the second flywheel side (212). In some embodiments, the cavity bottom (221) is located offset from the second flywheel side (212). In some embodiments, a flywheel side lip (215) is located on the second flywheel side (212) next to and between the flywheel outer periphery (214) and a cavity outer periphery (222). In some embodiments, the flywheel comprises an axle aperture (218) located in the flywheel center (213) from the first flywheel side (211) to the cavity bottom (221) on the second flywheel side (212). In some embodiments, the flywheel comprises a flywheel radial edge (216) located on the flywheel outer periphery (214) for a braking interface. In some embodiments, the flywheel comprises a sun gear (260) affixed to and concentrically located on the cavity bottom (221) on the second flywheel side (212). In some embodiments, the sun gear (260) extends out and away from the cavity bottom (221). In some embodiments, the flywheel is for an epicyclic gear system.

As used herein, the term "about" refers to plus or minus 10% of the referenced number.

The disclosures of the following U.S. Patents are incorporated in their entirety by reference herein: U.S. Patent Pub. No. 2005/0245347; U.S. Patent Pub. No. 2006/0217237; U.S. Patent Pub. No. 2008/0051258; U.S. Patent Pub. No. 2009/0036276; U.S. Patent Pub. No. 2009/0170667; U.S. Pat. No. 3,964,742; U.S. Pat. No. 4,272,094; U.S. Pat. No. 4,309,043; U.S. Pat. No. 4,632,386; U.S. Pat. No. 4,712,806; U.S. Pat. No. 4,880,224; U.S. Pat. No. 5,031,902; U.S. Pat. No. 5,480,366; and U.S. Pat. No. 7,163,491.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. An epicyclic gear system (100) comprising:
   (a) a flywheel assembly (200) comprising:
      (i) a cylindrical flywheel (210) having a planar first flywheel side (211), a second flywheel side (212), a flywheel center (213), and a flywheel outer periphery (214),
      wherein a cylindrical flywheel cavity (220) having a planar cavity bottom (221) is centrally disposed on the second flywheel side (212), wherein the cavity bottom (221) is disposed on a plane parallel to and offset from the second flywheel side (212),
      wherein an axle aperture (218) is disposed in the flywheel center (213) from the first flywheel side (211) to the cavity bottom (221) on the second flywheel side (212); and
      (ii) an annular sun gear (260) having a sun gear inner periphery (261) and a sun gear outer periphery (262), wherein a sun gear aperture (264) is disposed in a sun gear center (263), wherein the sun gear (260) is affixed to and concentrically disposed on the cavity bottom (221) on the second flywheel side (212), wherein the sun gear (260) extends out and away from the cavity bottom (221), wherein gear teeth (250) are disposed around the sun gear outer periphery (262);
   (b) a ring gear assembly (420) comprising:
      (i) an annular ring gear (240) having a ring gear inner periphery (241), a ring gear outer periphery (242), a first ring gear side (245), and a second ring gear side (246), wherein a ring gear aperture (244) is disposed in a ring gear center (243), wherein gear teeth (250) are disposed around the ring gear (240), wherein the ring gear (240) projects into the flywheel cavity (220) such that the first ring gear side (245) faces the flywheel cavity (220); and
      (ii) a plurality of cylindrical mounting pillars (230) disposed on and projecting from the second ring gear side (246);
   (c) a planet gear assembly (300) comprising:
      (i) an axle shaft (310);

(ii) a planet carrier having a carrier inner mounting component (321) and a carrier outer mounting component (322), wherein the carrier inner mounting component (321) is fixedly disposed on the axle shaft (310); and (iii) a planet gear (330) rotatably disposed on the carrier outer mounting component (322);

wherein the flywheel assembly (200), the planet gear assembly (300), and the ring gear assembly (420) are interfacingly disposed together, wherein the axle shaft (310) rotatingly passes through the axle aperture (218), the ring gear aperture (244), and the sun gear aperture (264), wherein the planet gear (330) engages the ring gear (240) and the sun gear (260) to provide a desired gear ratio for rotating the flywheel (210) via rotation of the axle shaft (310), the planet carrier (320), the planet gear (330), and the sun gear (260), wherein the sun gear (260) is fixedly attached to the flywheel (210), wherein the flywheel (210) and the sun gear (260) rotate independently of the axle shaft (310) of the planet gear assembly (300), wherein the planet carrier (320) is fixedly attached to the axle shaft (310) such that rotation of the axle shaft (310) causes rotation of the planet carrier (320), which in turn causes rotation of the planet gear (330) within the ring gear (240), wherein the planet gear (330) engages with the sun gear (260) such that rotation of the planet gear (330) directly drives rotation of the sun gear (260) and flywheel (210).

2. The system (100) of claim 1, wherein gear teeth (250) are disposed around the ring gear inner periphery (241).

3. The system (100) of claim 1, wherein the system (100) further comprises three planet gears (330) rotatably mounted on three outer mounting components (322).

4. The system (100) of claim 1, wherein a crank (315) is disposed on the axle shaft (310), wherein the axle shaft (310) is rotated via the crank (315).

5. The system (100) of claim 1, wherein the mounting pillars (230) are configured to be connected to a frame of an exercise machine (400).

6. The system (100) of claim 5, wherein the ring gear (240 disposed on the frame of the exercise machine (400) via the mounting pillars (230).

7. The system (100) of claim 5, wherein the exercise machine (400) a bicycle disposed on a stationary stand.

8. The system (100) of claim 1, wherein a flat flywheel radial edge (216) is disposed on the flywheel outer periphery (214) for a braking interface.

9. The system (100) of claim 8, wherein a resistance brake having a leather interface surface adjustably interfaces with the flat flywheel radial edge (216) of the flywheel outer periphery (214).

10. An epicyclic gear system (100) comprising:
(a) a flywheel assembly (200) comprising:
(i) a flywheel (210) having a first flywheel side (211), a second flywheel side (212), a flywheel center (213), and a flywheel outer periphery (214), wherein a flywheel cavity (220) having a cavity bottom (221) is centrally disposed on the second flywheel side (212), wherein the cavity bottom (221) is disposed offset from the second flywheel side (212), wherein an axle aperture (218) is disposed in the flywheel center (213) from the first flywheel side (211) to the cavity bottom (221) on the second flywheel side (212); and (ii) a sun gear (260) having a sun gear inner periphery (261) and a sun gear outer periphery (262), wherein a sun gear aperture (264) is disposed in a sun gear center (263), wherein the sun gear (260) is affixed to and concentrically disposed on the cavity bottom (221) on the second flywheel side (212), wherein the sun gear (260) extends out and away from the cavity bottom (221), wherein gear teeth (250) are disposed around the sun gear outer periphery (262);

(b) a ring gear assembly (420) comprising a ring gear (240) having a ring gear inner periphery (241), a ring gear outer periphery (242), a first ring gear side (245), and a second ring gear side (246), wherein a ring gear aperture (244) is disposed in a ring gear center (243), wherein gear teeth (250) are disposed around the ring gear (240), wherein the ring gear (240) projects into the flywheel cavity (220) such that the first ring gear side (245) faces the flywheel cavity (220); and (c) a planet gear assembly (300) comprising:
(i) an axle shaft (310);
(ii) a planet carrier (320) having a carrier inner mounting component (321) and a carrier outer mounting component (322), wherein the carrier inner mounting component (321) is fixedly disposed on the axle shaft (310); and
(iii) a planet gear (330) rotatably disposed on the carrier outer mounting component (322);

wherein the flywheel assembly (200), the planet gear assembly (300), and the ring gear assembly (420) are interfacingly disposed together, wherein the axle shaft (310) rotatingly passes through the axle aperture (218), the ring gear aperture (244), and the sun gear aperture (264), wherein the planet gear (330) engages the ring gear (240) and the sun gear (260) to provide a desired gear ratio for rotating the flywheel (210) via rotation of the axle shaft (310), the planet carrier (320), the planet gear (330), and the sun gear (260), wherein the sun gear (260) is fixedly attached to the flywheel (210), wherein the flywheel (210) and the sun gear (260) rotate independently of the axle shaft (310) of the planet gear assembly (300), wherein the planet carrier (320) is fixedly attached to the axle shaft (310) such that rotation of the axle shaft (310) causes rotation of the planet carrier (320), which in turn causes rotation of the planet gear (330) within the ring gear (240), wherein the planet gear (330) engages with the sun gear (260) such that rotation of the planet gear (330) directly drives rotation of the sun gear (260) and flywheel (210).

11. The system (100) of claim 10, wherein gear teeth (250) are disposed around the ring gear inner periphery (241).

12. The system (100) of claim 10, wherein the system (100) further comprises three planet gears (330) rotatably mounted on three outer mounting components (322).

13. The system (100) of claim 10, wherein a crank (315) is disposed on the axle shaft (310), wherein the axle shaft (310) is rotated via the crank (315).

14. The system (100) of claim 10, wherein the ring gear assembly (420) further comprises at least two mounting pillars (230) disposed on and projecting from the second ring gear side (246).

15. The system (100) of claim 14, wherein the mounting pillars (230) are configured to be connected to a frame of an exercise machine (400).

16. The system (100) of claim 15, wherein the ring gear (240) is disposed on the frame of the exercise machine (400) via the mounting pillars (230).

17. The system (100) of claim 15, wherein the exercise machine (400) is a bicycle disposed on a stationary stand.

18. The system (100) of claim 10, wherein a flywheel radial edge (216) is disposed on the flywheel outer periphery (214) for a braking interface.

19. The system (100) of claim 18, wherein a resistance brake having an interface surface adjustably interfaces with the flywheel radial edge (216) of the flywheel outer periphery (214).

\* \* \* \* \*